United States Patent [19]

Dean

[11] Patent Number: 5,147,579
[45] Date of Patent: Sep. 15, 1992

[54] MOISTURE RESISTANT SODIUM TITANATE AND POTASSIUM TITANATE

[75] Inventor: Terence C. Dean, Youngstown, N.Y.

[73] Assignee: Tam Ceramics, Inc., Niagara Falls, N.Y.

[21] Appl. No.: 380,926

[22] Filed: Jul. 17, 1989

[51] Int. Cl.$^5$ ............................................. C09K 3/00
[52] U.S. Cl. ...................................... 252/385; 427/215
[58] Field of Search ................. 427/215; 252/382, 384, 252/385

[56] References Cited

U.S. PATENT DOCUMENTS

| | | | |
|---|---|---|---|
| 3,656,921 | 4/1972 | Willcox | 427/215 |
| 3,742,185 | 6/1973 | Parks | 252/385 |
| 3,767,891 | 10/1973 | Haverstraw et al. | 252/385 |
| 3,769,491 | 10/1973 | De Long et al. | 252/385 |
| 3,867,178 | 2/1975 | Ritter et al. | 427/215 |
| 3,981,737 | 8/1976 | Evilampi et al. | 427/215 |
| 4,103,067 | 7/1978 | Jackson et al. | 252/385 |
| 4,207,377 | 6/1980 | Kindrick | 427/215 |
| 4,762,736 | 8/1988 | Garvey et al. | 427/215 |
| 4,814,202 | 3/1989 | Castelas | 427/215 |

FOREIGN PATENT DOCUMENTS

| | | | |
|---|---|---|---|
| 991562 | 5/1965 | United Kingdom | 427/215 |
| 1016777 | 1/1966 | United Kingdom. | |
| 1022621 | 3/1966 | United Kingdom. | |
| 1073338 | 6/1967 | United Kingdom. | |
| 1256421 | 12/1971 | United Kingdom. | |
| 1475172 | 6/1977 | United Kingdom. | |

OTHER PUBLICATIONS

German patent 1596833, Derwent abstract No.: 78924R-L.

*Primary Examiner*—Deborah L. Kyle
*Assistant Examiner*—Valerie Fee
*Attorney, Agent, or Firm*—Kenyon & Kenyon

[57] ABSTRACT

The present invention provides free flowing and moisture resistant compositions from normally hygroscopic compositions by a process of mixing the hygroscopic material with a sealing material and heat treating. By controlling the sealing material added, the heat treatment time, and the heat treatment temperature, the sealing material forms a glassy coating on the hygroscopic material that is impervious to moisture while retaining free-flow properties. The present invention particularly provides free-flowing and moisture resistant sodium titanate and potassium titanate compositions having a moisture pick-up = < about 0.5 wt. % by a process of mixing sodium titanate or potassium titanate with a sealing material and heat treating the mixture.

19 Claims, No Drawings

MOISTURE RESISTANT SODIUM TITANATE AND POTASSIUM TITANATE

BACKGROUND OF THE INVENTION

The present invention relates to hygroscopic compositions that are rendered free-flowing and moisture resistant, and particularly to free-flowing sodium titanate and potassium titanate, that have an $H_2O$ content = < - about 0.5 wt. %.

FIELD OF THE INVENTION

Welding is a metal-joining process wherein coalescence is produced by heating to suitable temperatures with or without the use of filler metal. Welding is widely used in building ships, machinery, boilers, atomic reactors, aircraft, railroad cars, missiles, and automobiles. Welding is also used in constructing pipes and storage tanks of steel, stainless steel, aluminum, nickel, copper, lead, titanium, tantalum, and their alloys. For many products, welding is the only joining process that achieves the desired strength properties, and leak-tightness.

Nearly all industrial welding involves fusion. The edges or surfaces to be welded are brought to a molten state and the liquid metal bridges the gap between the parts. After the source of welding heat has been removed, the liquid solidifies, thus joining or welding the parts together.

Arc welding is the most widely used of the various electric arc welding processes. Like the other electric-arc welding processes, it employs the heat of the electric arc to bring the work to be welded and a consumable electrode to a molten state. The work is made part of an electric circuit known as the welding circuit. Arc welding with consumable electrodes is more widely practiced than welding with nonconsumable electrodes. A consumable electrode is melted continuously by the arc, one pole of which is the electrode, the other pole being the metal to be welded. Usually, the consumable electrode is a wire of the same material as the work. The arc melts the electrode and some of the base metal to form a pool of weld metal, which after solidifying becomes the weld.

Cored electrodes consist of a tube formed from a metal strip and filled with slag-forming, arc-stabilizing, and alloying materials. These materials should be as hydrogen free as possible so that the weld is free from defects due to hydrogen. Sodium titanate and potassium titanate are frequently used in formulating cored welding rod powder formulations. Cesium titanate, rubidium titanate, francium titanate, and lithium titanate may also be used. The sodium titanate and potassium titanate content of a core powder is approximately 25 wt. % of the total formulation weight. An example of a commercially available sodium titanate additive is "TAM Ruflux SFF TM ." An example of a commercially available potassium titanate composition is "TAM Ruflux P TM ".

The advantages of sodium titanate and potassium titanate over other welding rod powders are the effects of $TiO_2$ (a slag former) and $Na_2O$ and $K_2O$ (arc stabilizers) which, in combination, provide good slag flow and sustained arc stability as well as giving a clean weld and better overall metallurgical weld properties.

The major disadvantage of sodium titanate and potassium titanate, cesium titanate, rubidium titanate, francium titanate, and lithium titanate, however, is their hygroscopic nature and their tendency to absorb significant amounts of moisture from the air which results in increased hydrogen content in the finished weld causing it to become brittle. Photomicrographs show that both sodium titanate and potassium titanate are granular and have fissures on the grain surfaces. In addition, the free-flow properties of the powder are affected by the increase in moisture pick-up, preventing uniform filling of the weld rods during manufacture.

The purpose of this invention is to reduce the moisture pick-up of hygroscopic compositions while maintaining their free flow properties.

The cored weld rod production process ,begins with a flat metal strip which is continuously fed through a series of rollers set at different angles. The metal strip is gradually crimped as it passes each roller station until it finally forms a butted joint. At the halfway stage, when the metal is in a "U" shaped form, weld rod powder is fed into the rod via a small hopper and vibrating table.

The finished weld rod is then heat treated at 650° F. to drive off lubricants which are present during the wire crimping operation.

Because the butted joint is not a perfect seal, the rods have to be stored in such a way as to avoid excessive moisture pick-up. This adds to the cost of the finished product.

Flowability of the weld rod powder is a specification requirement because of the need to fill the rod uniformly during the production process.

TAM Ruflux SFF TM (sodium titanate) typically absorbs between 2-3 wt. % $H_2O$ when exposed to an atmosphere of 80% RH/80° F. for 2-3 weeks. "TAM Ruflux P TM " (potassium titanate) typically absorbs between about 5-7 wt. % $H_2O$ when similarly exposed. In order to measurably reduce the degree of hydrogen embrittlement in a finished weld, the moisture pick-up of sodium titanate or potassium titanate must be reduced to about 0.5 wt. % or less.

A second requirement is that any improvement in the moisture resistance of the product must not seriously affect its natural free-flowing properties.

Preliminary experiments aimed at reducing the moisture pick-up of sodium titanate by coating with silicone oil were unsuccessful. Compared with a control containing no silicone oil coating the moisture pick-up rate was only fractionally lower and addition levels of about 1 wt. % seriously affected the flowability of the powder.

This approach was therefore abandoned in favor of the "sealing material" approaches described below.

SUMMARY OF THE INVENTION

It is an object of the present invention to provide free-flowing hygroscopic powder compositions that have low moisture absorption rates.

It is another object of the present invention to provide free-flowing sodium titanate and potassium titanate compositions that have moisture absorption rates = < - about 0.5 wt. %.

This objective is achieved by the present invention which provides a method for producing a free-flowing and moisture resistant sodium titanate or potassium titanate composition by sealing the sodium titanate or potassium titanate with a glassy layer so as to form a vapor barrier.

The process described in this invention provides a method for making free flowing sodium titanate and potassium titanate compositions that have $H_2O$ absorption rates = <about 0.5 wt. % comprising: adding sealing material to the sodium titanate or potassium titanate; mixing; heat treating; screening; and drying. A possible alternative to coating the surface of sodium titanate grains with a moisture repellant oil as described above would be to add sealing material which, when mixed with sodium titanate or potassium titanate and heat treated, could form an impervious glassy layer bonded to the surface of the grain thus preventing moisture from reaching the "core" of sodium titanate or potassium titanate. Since the layer would only need to be of minimal thickness, the flowability of the treated material would be expected to be similar to that of "dry" virgin sodium titanate.

Low melting glass formers such as amorphous silica, sodium borate tetrahydrate, Arc Furnace Fume Silica (AFS) (A TAM product) and boric acid were chosen as likely candidates for achieving the required goals of low moisture absorption and flowability. The boric acid and sodium borate mixes were abandoned at an early stage because of their high moisture pick-up levels.

DETAILED DESCRIPTION OF THE INVENTION

As set forth below, the method of producing moisture resistant material from hygroscopic compositions has several advantages which result in substantial technological advancement and cost savings while enhancing desirable properties.

The process of the invention involves adding a sealing material which, when mixed with a hygroscopic composition and heat treated, forms an impervious glassy layer bonded to the surface grains of the hygroscopic material thus preventing moisture from reaching the "core" of the hygroscopic material.

A stock of several kilograms of a production lot of TAM Ruflux SFF ™ was stored permanently in a laboratory oven at 150° C. This served as a source of "dry" sodium titanate throughout the investigation. A stock of several kilograms of "TAM Ruflux P ™" was stored in the same manner to provide a "dry" source of potassium titanate.

Formulations were prepared by weighing a fixed amount of "dry" sodium titanate or potassium titanate into a tared mixing jar and adding a known weight of the sealing material. The jar was sealed and mixed rapidly on a "Red Devil" ™ paint mixer for 1 hour.

Samples of the powder mixes were then transferred to zircon saggers and heat treated at various temperatures in a laboratory furnace for two hours. Table 1 shows the effect of various heat treatment times on the moisture pick-up of $Na_2TiO_3$ treated with $SiO_2$.

TABLE 1

EFFECT OF HEAT TREATMENT ON MOISTURE PICK-UP OF $Na_2TiO_3$ TREATED WITH $SiO_2$

| Sample | Heat Treatment | $H_2O$ pick-up after 120 hrs. @ 80% RH/20° C. | Flow Test ASTM B213 |
|---|---|---|---|
| $Na_2TiO_3$ (Untreated) | — | 2.5% | Did not flow |
| $Na_2TiO_3$ + 10% Supersil | 850° C./5 min. | 1.2% | " |
| $Na_2TiO_3$ + 10% Supersil | 850° C./10 min. | 0.4% | Flowed |
| $Na_2TiO_3$ + 10% Supersil | 850° C./15 min. | 0.5% | " |
| $Na_2TiO_3$ + 10% Supersil | 850° C./20 min. | 0.3% | " |

TABLE 1-continued

EFFECT OF HEAT TREATMENT ON MOISTURE PICK-UP OF $Na_2TiO_3$ TREATED WITH $SiO_2$

| Sample | Heat Treatment | $H_2O$ pick-up after 120 hrs. @ 80% RH/20° C. | Flow Test ASTM B213 |
|---|---|---|---|
| $Na_2TiO_3$ + 10% Supersil | 850° C./30 min. | 0.2% | " |
| $Na_2TiO_3$ + 10% Supersil | 850° C./2 hrs. | 0.06% | " |

Heat treated mixes were screened through a 40 mesh sieve and placed in tared drying dishes in a laboratory oven at 150° C. for 2 hours.

The drying dishes plus contents were then transferred to a "dry" dessicator to cool, followed by a final weighing to check the calcined powder mix weight. Moisture pick-up studies were performed by placing the "dry" samples in a dessicator containing a saturated solution of ammonium chloride at room temperature (representing an atmosphere of 80% RH) and the weight increase with time measured over a period of approximately 500 hours.

A control experiment using untreated sodium titanate and potassium titanate was performed with each batch of experimental mixes.

Flow tests were carried out immediately after the moisture pick-up studies discussed above using the Hall flowmeter (ASTM B213). In this test, 50 g. of the sample are placed in a cup with funnelled sides and the time measured for complete free flow discharge. To pass the test, powder must flow continuously without bridging. Typically the time taken to discharge is approximately 60 seconds.

In a preferred embodiment, 10 wt. % AFS is added to $K_2TiO_3$ and heat treated at 750° for 2 hours. Table 2 shows that the $H_2O$ pick-up after 120 hours at 80% RH/20° C. was 0.3 wt. % and the sample passed the flow test.

TABLE 2

EFFECT OF $SiO_2$ ON MOISTURE PICK-UP OF $K_2TiO_3$

| Sample | Heat Treatment | $H_2O$ pick-up after 120 hrs. @ 80% RH/20° C. | Flow Test ASTM B213 |
|---|---|---|---|
| $K_2TiO_3$ (untreated) | — | 5.4 wt. % | Did not flow |
| $K_2TiO_3$ 5 wt. % AFS | 750° C./2 hrs. | 2.2 wt. % | Did not flow |
| $K_2TiO_3$ + 7.5 wt. % AFS | 750° C./2 hrs. | 1.7 wt. % | Did not flow |
| $K_2TiO_3$ + 10 wt. % AFS | 750° C./2 hrs. | 0.3 wt. % | Flowed |
| $K_2TiO_3$ + 7.5 wt. % AFS | 850° C./2 hrs. | 1.0 wt % | Did not flow |
| $K_2TiO_3$ + 10 wt. % AFS | 850° C./2 hrs. | 0.06 wt. % | Flowed |

In another preferred embodiment, 10 wt. % AFS is added to $K_2TiO_3$ and heat treated at 850° C. for 2 hours. Table 2 shows that the $H_2O$ pick-up after 120 hours @ 80% RH/20° C. was 0.06 wt. % and the sample passed the flow test.

In another preferred embodiment 5 wt. % Supersil ™ (very finely divided silica) is added to $Na_2TiO_3$ and heat treated at 750° C. for 2 hours. Table 3 shows that the $H_2O$ pick-up after 120 hours @ 80% RH/20° C. was 0.4 wt. % and the sample passed the flow test.

TABLE 3

EFFECT OF wt. % ADDITION OF SiO2 ON MOISTURE PICK-UP OF Na2TiO3

| Sample | Heat Treatment | H2O pick-up after 120 hrs. @ 80% RH/20° C. | Flow Test ASTM B213 |
|---|---|---|---|
| Na2TiO3 (untreated) | — | 2.5 wt. % | Did not flow |
| Na2TiO3 + 2 wt. % Supersil | 500° C./2 hrs. | 1.3 wt. % | Did not flow |
| Na2TiO3 + 2 wt. % Supersil | 750° C./2 hrs. | 1.01 wt. % | Did not flow |
| Na2TiO3 + 5 wt. % Supersil | 500° C./2 hrs. | 1.2 wt. % | Did not flow |
| Na2TiO3 + 5 wt. % Supersil | 750° C./2 hrs. | 0.4 wt. % | Flowed |
| Na2TiO3 + 10 wt. % Supersil | 750° C./2 hrs. | 0.4 wt. % | Flowed |

In another preferred embodiment, 10 wt. % Supersil TM is added to Na2TiO3 and heat treated at 750° C. for 2 hours. Table 4 shows that the H2O pick-up after 120 hours @ 80% RH/20° C. was 0.22 wt. % and the sample passed the flow test.

TABLE 4

EFFECT OF GRADES OF SiO2 ON MOISTURE PICK-UP OF Na2TiO3

| Sample | Heat Treatment | H2O pick-up after 120 hrs. @ 80% RH/20° C. | Flow Test ASTM B213 |
|---|---|---|---|
| Na2TiO3 (untreated) | — | 2.5 wt. % | Did not flow |
| Na2TiO3 + 10 wt. % Supersil | 500° C./2 hrs. | 1.4 wt. % | Did not flow |
| Na2TiO3 + 10 wt. % Supersil | 750° C./2 hrs. | 0.22 wt. % | Flowed |
| Na2TiO3 + 10 wt. % Cabasil | 500° C./2 hrs. | 1.6 wt. % | Did not flow |
| Na2TiO3 + 10 wt. % Cabasil | 750° C./2 hrs. | 0.2 wt. % | Flowed |
| Na2TiO3 + 10 wt. % Ludox | 500° C./2 hrs. | 1.1 wt. % | Did not flow |
| Na2TiO3 + 10 wt. % Ludox | 750° C./2 hrs. | 0.6 wt. % | Did not flow |
| Na2TiO3 + 10 wt. % AFS | 500° C./2 hrs. | 0.8 wt. % | Did not flow |
| Na2TiO3 + 10 wt. % AFS | 750° C./2 hrs. | 0.1 wt. % | Flowed |

In another preferred embodiment, 10 wt. % Cabasil TM (very finely divided silica) is added to Na2TiO3 and heat treated at 750° C. for 2 hours. Table 4 shows that the H2O pick-up after 120 hours @ 80% RH/20° C. was 0.2 wt. %. (Ludox TM is a colloidal suspension of silica in water.)

In an especially preferred embodiment, 10 wt. % AFS is combined with Na2TiO3 and heat treated at 750° C. for 2 hours. Table 5 shows that the H2O pick-up after 120 hours @ 80% RH/20° C. is 0.1 wt. % and the sample passed the flow test.

TABLE 5

EFFECT OF BAKING TEMPERATURE ON MOISTURE PICK-UP OF Na2TiO3 treated with SiO2

| Sample | Heat Treatment | H2O pick-up after 120 hrs. @ 80% RH/20° C. | Flow Test ASTM B213 |
|---|---|---|---|
| Na2TiO3 (untreated) | — | 2.5 wt. % | Did not flow |
| Na2TiO3 + 10 wt. % AFS | 300° C./2 hrs. | 1.5 wt. % | Did not flow |
| Na2TiO3 + 10 wt. % AFS | 500° C./2 hrs. | 0.8 wt. % | Did not flow |
| Na2TiO3 + 10 wt. % AFS | 750° C./2 hrs. | 0.1 wt. % | Flowed |
| Na2TiO3 + 10 wt. % AFS | 850° C./2 hrs. | 0.03 wt. % | Flowed |

In another especially preferred embodiment, 10 wt. % AFS is combined with Na2TiO3 and heat treated at 850° C. for 2 hours. Table 5 shows that the H2O pick-up after 120 hours @ 80% RH/20° C. is 0.03 wt. % and the sample passed the flow test.

CONCLUSIONS

Out of several sealing materials investigated, it was found that silicas performed most effectively.

The preferred sealing material was Arc Furnace Fume Silica (AFS) because of its cost, availability, and low H2O absorption while remaining free-flowing.

Optimum processing conditions to produce moisture resistant free-flowing powder were found to be 10 wt. % of AFS added to sodium titanate and heat treated at 850° C. for 2 hours.

What is claimed is:

1. A method for rendering granular hygroscopic materials moisture resistant and free flowing comprising:
    mixing a hygroscopic material with a sealing material, said sealing material having a melting point lower than said hygroscopic material and said sealing material having a particle size fine enough to enter surface fissures on said hygroscopic material;
    heat treating said mixture for a time and at a temperature sufficient to form a glassy moisture barrier between the hygroscopic material and the atmosphere;
    screening and drying the heat treated material.

2. The method of claim 1 wherein the hygroscopic material is sodium titanate.

3. The method of claim 1 wherein the hygroscopic material is potassium titanate.

4. The method of claim 1 wherein the hygroscopic material is cesium titanate.

5. The method of claim 1 wherein the hygroscopic material is rubidium titanate.

6. The method of claim 1 wherein the hygroscopic material is francium titanate.

7. The method of claim 1 wherein the hygroscopic material is lithium titanate.

8. The method of claim 2 wherein said sealing material comprises amorphous silica and is present in an amount equal to about 10 wt. % of the hygroscopic material and said mixture is heat treated at about 750° C. for about 2 hours.

9. The method of claim 3 wherein said sealing material comprises amorphous silica and is present in an amount equal to about 10 wt. % of the hygroscopic material and said mixture is heat treated at about 750° C. for about 2 hours.

10. The method of claim 2 wherein said sealing material comprises amorphous silica and is present in an amount equal to about 5 wt. % of the hygroscopic material and said mixture is heat treated at about 750° C. for about 2 hours.

11. The method of claim 2 wherein said sealing material comprises amorphous silica and is present in an amount equal to about 10 wt. % of the hygroscopic material and said mixture is heat treated at about 850° C. for about 2 hours.

12. The method of claim 3 wherein said sealing material comprises amorphous silica and is present in an amount equal to about 10 wt. % of the hygroscopic material and said mixture is heat treated at about 850° C. for about 2 hours.

13. The method of claim 2 wherein the sealing material comprises about Supersil TM and is present in an amount equal to about 5 wt. % of the hygroscopic material and said mixture is heat treated at about 750° C. for about 2 hours.

14. The method of claim 2 wherein the sealing material comprises Supersil TM and is present in an amount equal to about 10 wt. % of the hygroscopic material and said mixture is heat treated at about 750° C. for about 2 hours.

15. The method of claim 2 wherein the sealing material comprises Cabasil TM and is present in an amount equal to about 10 wt. % of the hygroscopic material and said mixture is heat treated at about 750° C. for about 2 hours.

16. The method of claim 2 wherein the sealing material comprises AFS and is present in an amount equal to about 10 wt. % of the hygroscopic material and said mixture is heat treated at about 750° C. for about 2 hours.

17. The method of claim 2 wherein the sealing material comprises AFS and is present in an amount equal to about 10 wt. % of the hygroscopic material and said mixture is heat treated at about 850° C. for about 2 hours.

18. The method of claim 3 wherein the sealing material comprises AFS and is present in an amount equal to about 10 wt. % of the hygroscopic material and said mixture is heat treated at about 750° C. for about 2 hours.

19. The method of claim 3 wherein the sealing material comprises AFS and is present in an amount equal to about 10 wt. % of the hygroscopic material and said mixture is heat treated about 850° C. for about 2 hours.

* * * * *